United States Patent [19]

Besik

[11] Patent Number: 4,711,097
[45] Date of Patent: Dec. 8, 1987

[54] APPARATUS FOR SORPTION DEHUMIDIFICATION AND COOLING OF MOIST AIR

[76] Inventor: Ferdinand Besik, 2562 Oshkin Crt., Mississauga, Ontario, Canada, L5N 3Z3

[21] Appl. No.: 922,887

[22] Filed: Oct. 24, 1986

[51] Int. Cl.[4] .............................................. F25D 23/00
[52] U.S. Cl. ...................... 62/271; 55/388; 62/93
[58] Field of Search .......... 62/235.1, 93, 271; 55/390, 387, 388, 389; 165/4

[56] References Cited

U.S. PATENT DOCUMENTS 4,227,375  10/1980  Tompkins et al. ............... 62/235.1

Primary Examiner—Henry A. Bennet

[57] ABSTRACT

An apparatus for dehumidification and cooling of moist air for use in ventilation and air - conditioning applications comprises two fixed bed sorption dehumidification-heat recovery units equipped with a valving system permitting continuous countercurrent cyclic operation removing moisture and sorption heat from the treated moist outdoor air to provide dehumidified and cool fresh air. Additional cooling of the treated fresh air if desired may be achieved in a conventional direct evaporative cooler. Released sorption heat is recovered and used in reactivation of the spent sorbent material with the required additional heat being provided by fossil fuel, solar or waste heat energy sources. Small amount of electric power is used for operation of two air blowers that provide also balanced ventilation of the air conditioned space. Cooling COP of the apparatus is higher than that of the prior art systems.

8 Claims, 2 Drawing Figures

APPARATUS FOR SORPTION DEHUMIDIFICATION AND COOLING OF MOIST AIR

FIELD OF INVENTION

The present invention relates to an apparatus for cyclic sorption dehumidification and cooling of moist air for use in ventilation, dehumidification and cooling of an air conditioned space.

BACKGROUND TO THE INVENTION

Regardless of climatic conditions, commercial, institutional and industrial buildings are air conditioned due to the steady escalation of internal heat gains. Depending on the type, building occupancy and climate, the cost of air conditioning systems vary from 10 to 30 percent of total construction costs with the cooling plant accounting for more than half of the total air conditioning system cost.

In the various industrial sectors many process and manufacturing operations involve process cooling to maintain the plant performance, with the required cooling system representing a significant portion of the overall plant capital, amortization and operating costs.

Combinations of unit operations used in cooling systems may include heat exchange, indirect and direct evaporative cooling, mechanical vapour compression refrigeration, absorption refrigeration and adsorption or absorption dehumidification. Alternative combinations of these operations are being sought by users seeking lower operating costs and by utilities facing increasing demand for electric power used to operate these facilities.

One prior art system recently developed by Cargo Caire Engineering Corp. (Gas Research Institute Digest, Vol. 8. No. 4., Winter 1985/86, p. 30) uses a combination of adsorption dehumidification, vapour compression refrigeration, evaporation and heat exchange operations to dehumidify and cool the outdoor air for use in air conditioning of space. In the adsorption dehumidification stage of the treatment the prior art system uses a rotating adsorbent wheel concept with a waste heat recovery heat exchanger to improve the efficiency of the adsorption stage and uses natural gas as fuel to preheat the air used to reactivate spent adsorbent.

Another prior art system described by U.S. Pat. No. 4,222,244 issued to G. Meckler, uses a combination of adsorption rotating wheel dehumidification, vapour compression refrigeration and heat exchange operations to cool air for air conditioning and uses waste heat energy and solar energy to reactivate spent adsorbent.

Survey of prior art systems indicates, that the current air cooling systems using the adsorption dehumidification treatment step are not capable of producing the required low temperatures of air without the vapour compression or the absorption refrigeration treatments.

SUMMARY OF INVENTION

In accordance with embodiments of the present invention, it has now been found that the required dehumidification and cooling of moist air with simultaneous ventilation of the air conditioned space can be effectively achieved by an apparatus comprising two cyclic sorption dehumidification—heat recovery units and a conventional direct evaporative cooler without mechanical vapour compression or absorption refrigeration systems that are essential to the prior art.

In accordance with embodyments of the present invention it has now been found that even for situations with extremely high humidities of the outdoor air cold fresh air can be produced either in a single stage or a double stage arrangement of the apparatus of the present invention in a treatment comprising counter-current cyclic sorption dehumidification—cooling followed by additional direct evaporative cooling.

It has been found that the released sorption heat can be effectively recovered and used for reactivation of the spent sorbent material.

It has been also found that both the adiabatic sorption and the followed desorption of moisture can be carried out at atmospheric pressure.

Since the apparatus of this invention can provide cold low humidity fresh air, it may be effectively used in ventilation, dehumidification and cooling air conditioning applications.

GENERAL DESCRIPTION OF THE INVENTION

Figure 1:
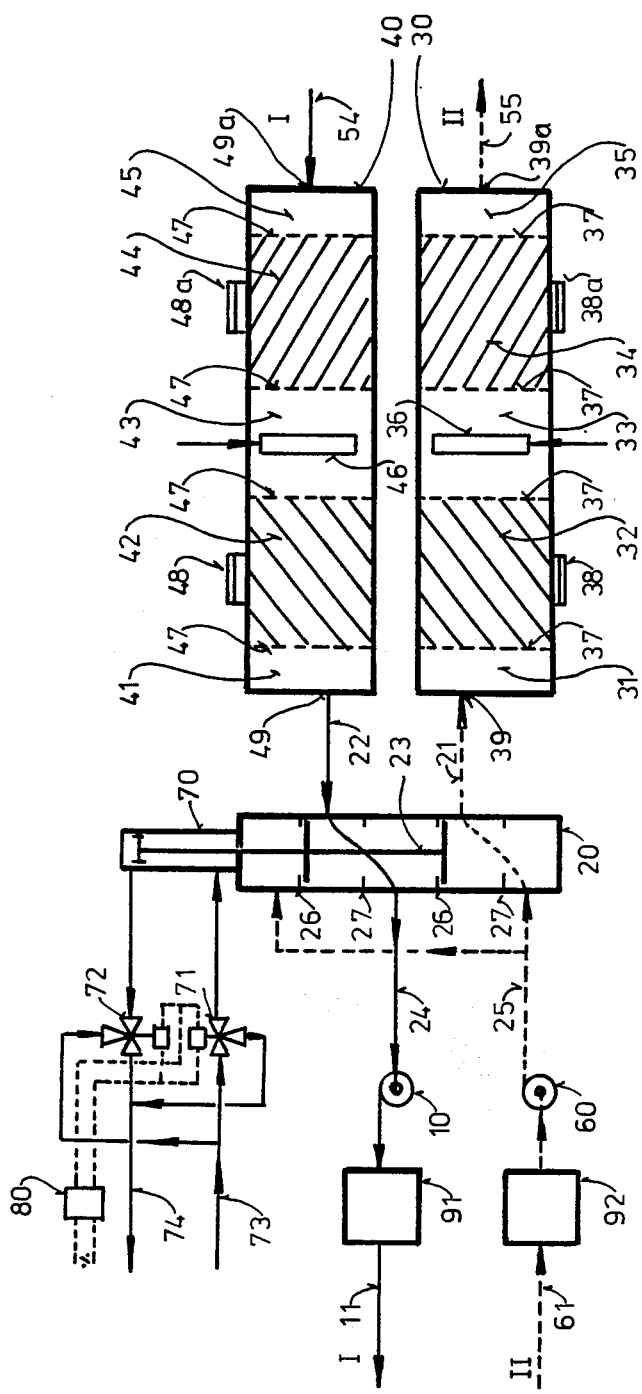
FIG. 1 is a schematic of one prefered embodyment of the apparatus of the present invention for dehumidification and cooling of moist air.

Engineering principles of the unit operation of adsorption are known and documented and the operation is effectively used in many applications involving recovery of solvents, separation of petrochemicals, separation of oxygen and nitrogen from air, removing of toxic gases from gas streams and removing of moisture from liquid and gaseous products. Similarly, principles of evaporative cooling are well known and the operation to broadly used including air conditioning applications.

Adsorption systems used in dehumidification of air may use an adsorbent-desiccant structure which may be a fixed bed, a moving bed, or a rotating bed which may be a disc, drum or wheel, and containing a suitable adsorbent-desiccant or which structure may be filled with an inert porous solid material impregnated with liquid absorbent such as lithium chloride.

The fixed bed systems may use a single, two, or more fixed packed beds of granular sorbent, are provided with a valve arrangement permitting the cycling of the treated air and the regenerant streams between individual fixed beds, and can simulate a perfect countercurrent system. The rotating systems are equipped with suitable rotating mechanism to rotate the absorbent bed between the processed air and regenerant streams which are separated from each other by seals to prevent mixing. All systems are equipped with an adsorbent reactivation subsystem. The reactivation of spent adsorbent may be either by the heat energy of the regenerant, by evacuation of the adsorbent bed, by heating of the bed, by an inert dry gas or by some combination thereof.

It is well known that the amount of moisture removed from air by adsorption depends on properties of the adsorbent, on the temperature of the absorbent during adsorption, on the temperature, pressure and humidity of the treated air, and on the contact time of the treated air with the adsorbent.

It is also known that the effectiveness of reactivation of spent adsorbent depends on the rate and magnitude of change of the moisture-adsorbent equilibrium, which depends on the reactivation temperature, pressure, vapour pressure of moisture in regenerant and heat capacity of the adsorbent.

It is also known that the released adsorption heat and the residual heat retained by adsorbent from the previous desorption cycle cause an increase in the temperature of the adsorbent bed and of the treated air and inhibit the effectiveness of removal of moisture.

It is also known that adiabatic cooling of dry air in direct contact with water reduces the treated air temperature and that the resulting air-water temperatures depend on the dry bulb temperature and initial humidity of the air, initial temperature of the water and on the effectiveness of the evaporator. And it is also well known that the quality of the out door air depends on weather conditions and location.

While all the above process principles are known and well documented, it remains, that the current art cooling systems can not produce the required low temperatures of the treated air without a cooling step involving either the vapour compression refrigeration or the absorption refrigeration.

It is therefore the object of the present invention to provide an apparatus capable of producing the low temperature low humidity fresh air from moist outdoor air without the vapour compression or absorption refrigeration stages.

To achieve the objective the present invention provides an apparatus in which the moist air is simultaneously: dehumidified by sorption in a fixed bed of solid sorbent material, the released heat of sorption is recovered in a fixed bed of a heat exchanging material, the dehumidified air is cooled in a fixed bed of the heat exchanging material, the stale air is exhausted from the airconditioned space, the exhausted air is used for cooling of the heat exchanging material for recovery of the sorption heat from the heat exchanging material and after being heated for reactivation of the spent sorbent material.

Additional cooling and humidification of the dehumidified and cooled air is achieved in a conventional direct evaporative cooler.

DESCRIPTION OF PREFERED EMBODIMENTS

Refering to drawings, FIG. 1 shows a schematic of one preferred embodiment of the apparatus of the present invention comprising air blowers 10, 60, a four way valve 20, fixed bed treatment units 30,40, a hydraulic actuator 70 with solenoid valves 71, 72 and a solid state on-off cyclic timer 80.

The two air blowers are prefereably of the same capacity and are provided for a balanced flow of the first air stream I and the second air stream II through the apparatus. While FIG. 1 shows the First air stream I as being drawn through the fixed bed treatment unit 40 and the second air stream II as being pumped through the fixed bed treatment unit 30, it should be understood that it is also feasible to operate the apparatus in a manner in which the first air stream I will be pumped and the second air stream drawn through the treatment units 30,40.

The plunger 23 of the 4-way valve 20 is being moved between positions 26,27 by the hydraulic actuator 70 which is powered by tap water 73,74 through the normally closed solenoid valve 71 and normally opened solenoid valve 72. The solenoid valves 71,72 are controled by a variable on-off cyclic timer 80 which controls the duration of the operating cycle.

An operating cycle comprises a sorption period and a desorption period preferably of the same duration time. Consequently, to permit balanced cyclic countercurrent operation of the two fixed bed treatment units, the cyclic timer changes the position of the 4-way valve exactly in the middle of the operating cycle initiating the desorption period in the treatment unit with preceded sorption period and an sorption period in the treatment unit with preceded desorption period. The cyclic timer actuates the solenoid valves 71,72 which then allow the tap water to move the hydraulic actuator 70 and the plunger of the 4-way valve from one to the other position between positions 26, 27, causing a switch in the flow of the first and the second air streams between the two treatment units 30, 40. It should be understood that it is also possible to achieve the same operation of the apparatus by using four individual powered air dampers or air valves in place of the described 4-way valve 20.

Since the time required for changing the position of the plunger 23 is very small compared to the time spent in one or the other positions 26, 27, the flow of the two air streams through the apparatus is essentially continuous, with respect to the two treatment units 30, 40 the flow of the two air streams is cyclic, and with respect to the flow direction the flow of the two air streams is countercurrent. Consequently, the heat and mass transfer operations occuring in treatment units 30,40 are cyclic and perfectly counter-current.

The two treatment units 30,40 are identical, each being a closed vessel provided with an air intake and air exit openings 39, 39a, 49, 49a located on the opposite end walls, inside of each vessel being separated by four build in screens 37, 47 into five consecutive chambers 31,32,33,34,35 and 41,42,43,44,45. Chambers 31,35 and 41,45 are empty and are provided for distribution of the two air streams across the whole surface area of the screens 37,47.

Depending on which of the two air streams is to be dried, one of chambers 32,34 and 42,44 is filled with sorbent material, the other with a heat exchanging material. To fill in and to withdraw the sorbent and heat exchanging materials these chambers are also equipped each with two flanged openings 38,38a and 48, 48a located on one side wall.

The used sorbent material may be any of the commercially available adsorbents—desiccants, or prefereably it may be an inexpensive porous ceramic gravel impregnated with a suitable commercially available absorbent such as lithium chloride or lithium bromide. The chamber is filled with the sorbent material to provide a fixed bed of sorbent of a specific bed porosity.

The heat exchanging material used in the other chamber may be any commercially available ceramic or matallic packing including Raschig rings, Pall rings, Berl saddles, Intalox saddles, or preferably an inexpensive ceramic or stone gravel. The chamber is filled with the heat exchanging material to provide a fixed bed of specific porosity.

If the first air stream is to be dehumidified, then chambers 34,44 are filled with the sorbent material and chambers 32,42 with the heat exchanging material. If the second air stream is to be dehumidified then chambers 32,42 are filled with the sorbent material and chambers 34,44 with the heat exchanging material.

Chambers 33,43 are fitted with identical air heaters 36, 46 provided for heating of only one of the two air streams that has been selected as the regenerant stream to be used for reactivation of the spent sorbent material. Since flows of the two air streams in the middle of the operating cycle are switched between the two treatment units 30,40, operation of heaters 36,46 is also cyclic and controlled by the cyclic timer 80.

The heaters 36,46 may be natural gas, propane, oil or other fuel fired burners with the combustion products being mixed with the regenerant air stream and may be equipped with standard on-off combustion controls, or they may be electric heaters, or finned heating coils heated by a suitable heating medium.

Depending on the application the two fixed bed treatment units 30,40 may or may not be combined with direct evaporative coolers 91,92 provided for adiabatic cooling of the first and second air streams, with cooler 91 cooling and humidifying the first air stream exiting from the treatment units 30,40 and with cooler 92 cooling the second air stream entering the treatment units.

While the embodiment of FIG. 1 has been described with a single 4-way valve it is obvious that same treatment effect may be achieved by replacing the 4-way valve with four standard powered air valves or air dampers.

For the situation when the first air stream I is to be dehumidified and cooled and the second air stream II is to be used as regenerant air, the operation of the apparatus of FIG. 1 is as follows.

In this case chambers 34,44 of treatment units 30,40 are filled with the sorbent material, while chambers 32,42 with the heat exchanging material. During the first half of the operating cycle the first air stream I is drawn by air blower 10 through line 54 into chamber 45 of treatment unit 40 then through screen 47 into and through the fixed bed of sorbent material in chamber 44 into and through chamber 43 into and through fixed bed of the heat exchanging material in chamber 42, then into and through chamber 41, valve 20, line 24 and blower 10 and finally into and through the evaporative cooler 91 and out of apparatus via line 11.

Simultaneously, the second air stream II is drawn by air blower 60 through line 61 into and through the direct evaporative cooler 92, then pumped by air blower 60 through 4-way valve 20 into chamber 31 of treatment unit 30, then through the fixed bed of the heat exchanging material located in chamber 32 into chamber 33, then through the fixed bed of the sorbent material in chamber 34, chamber 35 and via line 55 out of the apparatus.

In the middle of the operating cycle the plunger 23 of the 4-way valve changes its position from position 26 into position 27 and consequently the first air stream I is now drawn by air blower 10 via line 55 into chamber 35 of treatment unit 30 then through treatment unit 30, 4-way valve 20, blower 10 into and through direct evaporative cooler 91 and out of the apparatus via line 11, while the second air stream II is being drawn by blower 60 through evaporative cooler 92 and then pumped by blower 60 through the 4-way valve into and through the treatment unit 40 and out of the apparatus via line 54.

At the end of the operating cycle the 4-way valve again switches its plunger position to start a new operating cycle.

During the first half of the operating cycle when the first air stream I flows through treatment unit 40 and the second air stream II through treatment unit 30 the following heat and mass transfer operations occur in treatment units 30,40 simultaneously. In treatment unit 40: the first air stream I during the first half of the operating cycle when passing through the fixed bed of the sorbent material in chamber 44 is dehumidified by sorption of the air moisture onto the active sorbent material. The released sorption heat and the residual heat retained by the sorbent material from the preceded desorption period, both cause an increase of the temperature of the dehumidified air passing through chamber 44, then through chamber 43 into and through the fixed bed of the heat exchanging material, which during the preceded desorption period was cooled by the second air stream II. When passing through the cooled heat exchanging material the heated dehumidified first air stream I gives up its heat to the heat exchanging material thus causing simultaneously a drop in its temperature and an increase in the temperature of the heat exchanging material. With respect to the perfectly countercurrent flow of the first air stream I and the second air stream II through the fixed bed of the heat exchanging material during the consecutive sorption-desorption periods, the dehumidified first air stream I when passing through the fixed bed of the heat exchanging material is cooled down very close to the temperature of the adiabatically cooled second air stream II. Because the fixed bed of the heat exchanging material has a large heat transfer surface area and because of the countercurrent flow of the two air streams through the fixed bed, heat transfer effectiveness as high as 95% in fixed beds 32,42 is economically feasible. In treatment unit 30: The adiabatically cooled second air stream II during the first half of the operating cycle, when passing through the fixed bed of the heat exchanging material in chamber 32, which heat exchanging material was heated during the preceded sorption period, is heated up by picking up heat from the heated heat exchanging material thus causing simultaneously an increase in its temperature and a drop in the temperature of the heat exchanging material. The preheated second air stream II when passing through chamber 33 is further heated up by heater 36 to the required desorption temperature and then pumped into and through the fixed bed of spent sorbent material in chamber 34. When the heated second air stream II passes through the fixed bed of the sorbent material it gives up its sensible heat to the sorbent material which in turn releases the moisture absorbed during the preceded sorption period. The evaporation of the moisture from the sorbent material causes a drop in the temperature of the second air stream II and an increase of the second air stream II humidity. In this manner the spent sorbent material is reactivated and the moisture removed from the sorbent material is discharged with the second air stream II out of the apparatus.

In the second half of the operating cycle the two air streams are switched between the two treatment units so that the desorption is occuring in unit 40 while sorption in unit 30. In this manner the apparatus produces a continuous stream of dehumidified and cooled fresh air. Typical operating conditions and the quality of the fresh and the exhausted air streams at different points through the apparatus is given in Example 1.

Figure 2:
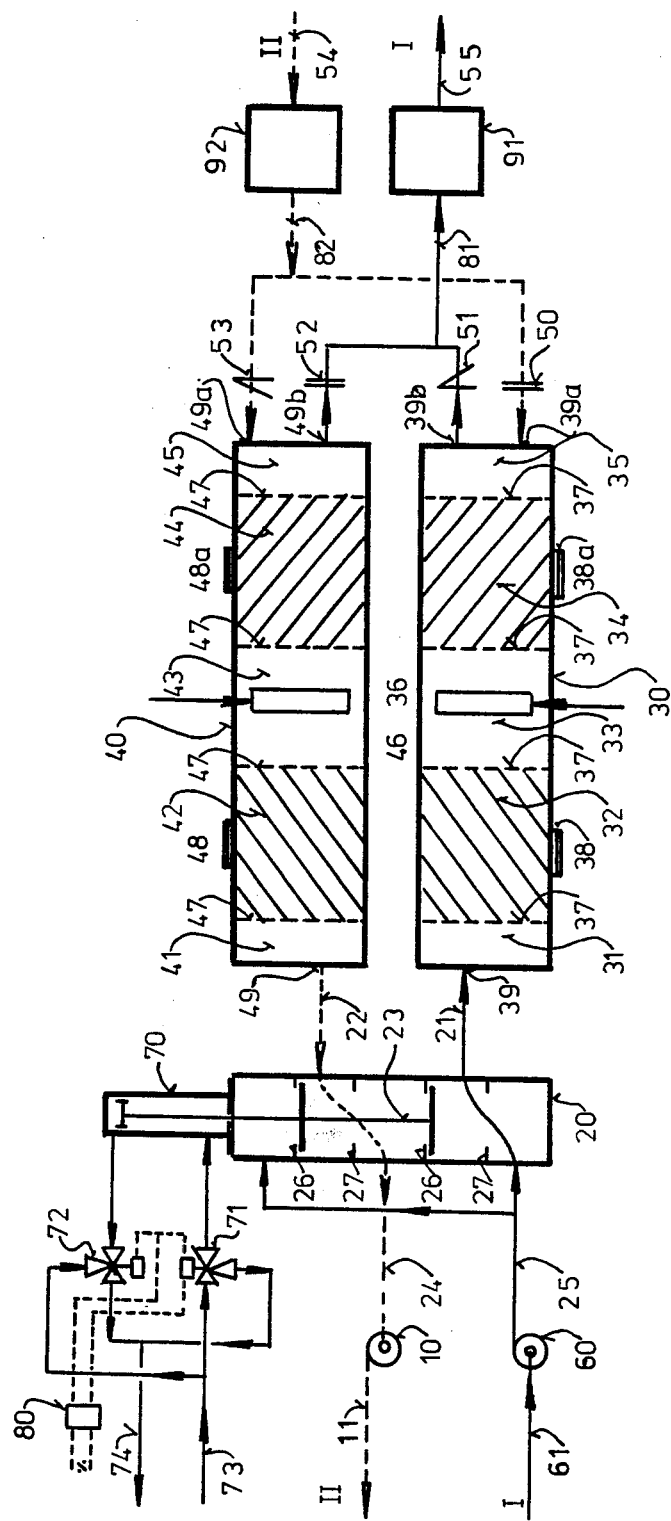
FIG. 2 is a schematic of another prefered embodiment of the apparatus of the present invention for dehumidification and cooling of moist air.

FIG. 2 shows a schematic of another prefered embodiment of the present invention in which the fixed bed treatment units 30,40 discussed in detail under the embodiment of FIG. 1 are in addition provided with an air exit openings 39b, 49b and check valves 50, 51, 52, 53 for permitting a single point discharge 81 of the first air stream I and a single point intake 82 of the second air stream II and in which contrary to embodyment of FIG. 1 the first air stream I is being pumped through the fixed bed treatment units 30,40 and the second air stream II is being drawn through the treatment units 30, 40. For a situation when the moist air stream to be dehumidified and cooled is the first air stream I the fixed beds of the sorbent material are located in chambers 32,42 and the fixed beds of the heat exchanging material in chambers 34, 44.

Operation of the apparatus of FIG. 2 is same as of FIG. 1 and the operating conditions and qualities of the two air streams at different points through the apparatus of FIG. 2 are also the same as those given in Example 1.

As evident from the described embodiments and Example 1, the apparatus of the present invention is capable of producing cold fresh air from moist outdoor air without using the vapour compression or absorption refrigeration steps and with COPs that are substantially higher than those of prior art systems.

EXAMPLE 1

The following are calculated data based on thermodynamic analysis of the cooling process carried out in the apparatus of the present invention supported by material and energy balances and thermodynamic properties of moist air assuming equilibrium relationships.

Example: Determine operating conditions and properties of the treated outdoor air and the exhausted stale air at different points through the apparatus of FIG. 1 with the produced cold fresh air being used for ventilation and cooling of an air conditioned building assuming:

Location: Tampa, Fla., outside air design conditions: dry bulb temperature 90° F., wet bulb temperature 82° F.; exhausted air conditions: dry bulb temperature 80° F., wet bulb temperature 66.5° F.; the source of heat energy for regeneration of sorbent material is natural gas.

The selected calculated process data are summarized in Table 1.

sion or absorption refrigeration units that are essential to prior art systems.

The apparatus of the present invention is simple, operates at atmospheric pressures, requires minimum maintenance and uses substantially less electric power than the prior art systems. Modifications are possible within the scope of the present invention and the following claims.

I claim:

1. An apparatus for dehumidifying and cooling moist air comprising:
two identical fixed bed treatment units providing dehumidification and cooling of said moist air, said treatment units each being a closed vessel provided with an air intake and an air exit openings located on its opposite end walls, said vessel having its inside space separated by four parallel build in screens into five consecutive chambers permitting a straight line flow of said moist air through said five consecutive chambers, said first and fifth chambers being empty chambers, said second chamber being equipped with two flanged openings located on one of its side walls and being provided for filling in and for removing from said chamber a solid heat exchanging material, said second chamber being filled with said heat exchanging material to provide a fixed bed of said heat-exchanging material of a specific fixed bed porosity, said fixed bed of heat exchanging material being provided for transfering heat from said dehumidified moist air stream into a second air stream, said second air stream being used as regenerant air stream, said third chamber being equipped with a build in air heater providing heating of said second air stream, said fourth chamber being equipped with two flanged openings located on one of its side walls and provided for filling in and removing from said fourth chamber a solid sorbent material, said fourth chamber being filled with said solid sorbent material to provide a fixed bed of said sorbent material of specific porosity, said fixed bed of said sorbent material providing the removal of

TABLE 1

PROPERTIES OF PROCESSED AIR STREAMS THROUGH THE APPARATUS.

| Parameter | Units | Outdoor air | | | | Exhausted air | | | | |
|---|---|---|---|---|---|---|---|---|---|---|
| | | in | leaving sorbent | leaving heat ex. material | leaving cooler | in | leaving cooler | leaving heat ex. material | leaving heater | leaving sorbent |
| Dry bulb temp. | °F. | 90.0 | 154.0 | 72.4 | 60.0 | 80.0 | 68.3 | 149.7 | 183 | 121 |
| Humidity | lb H20 lb d air | .022 | .0072 | .0072 | .0103 | .0110 | .0139 | .0139 | .0139 | .0287 |
| Enthalpy | BTU lb d air | 46.0 | 46.0 | 25.6 | 25.6 | 31.5 | 31.5 | 51.9 | 61.0 | 61.0 |
| Pressure | Inch W.C. | atm | −.15 | −.30 | +.50 | atm | +.50 | +.35 | +.15 | atm. |

Heat removed from outdoor air: 20.4 BTU/lb. dry air
Heat energy used in heater: 9.1 BTU/lb. dry air
COP - cooling outdoor air: 2.24
Moisture removed from outdoor air: .0117 lb H20/lb dry air
Heat removed from air conditioned space: 5.9 BTU/lb dry air
COP - conventional absorption chiller: .6-.9

SUMMARY OF DISCLOSURE

In summary of this disclosure, the present invention provides an apparatus for producing dehumidified or cold fresh air from moist outdoor air for use in ventilation, dehumidification and cooling air conditioning applications without the need for the vapour compresmoisture from said moist air, said two fixed bed treatment units being provided with valving means, said valving means providing switching of said moist air stream and said second air stream between said two fixed bed treatment units in the middle of the operating cycle in a manner permitting continuous countercurrent cyclic operation of said two treatment units, said cyclic operation having an operating cycle comprising a sorption period followed by a desorption period, said operating cycle having its duration controled by a solid state on-off cyclic timer actuating said valving means, said sorption period being provided for removing moisture from said moist air stream in said fixed bed of said sorbent material and for cooling of said dehumidified moist air stream in said fixed bed of said heat exchanging material, said desorption period being provided for preheating of said second air stream in said fixed bed of said heat exchanging material and for heating of said second air stream by said air heater, and for desorption of said moisture from said fixed bed of sorbent material accumulated by said sorbent material during said sorption period and for discharging of said desorbed moisture out of said apparatus, two air blowers for pumping said moist air and said second air streams through said treatment units, said moist air and second air streams flowing continuously through said two treatment units countercurrently to each other with said moist air stream flowing through said one treatment unit while said second air stream flowing through said other treatment unit during the first half of the operating cycle, with the flow of said moist air and second air streams being switched between said two treatment units in the middle of said operating cycle by said valving means in a manner permitting a cyclic countercurrent sorption-desorption and heat transfer to occur in said fixed bed treatment units.

2. An apparatus of claim 1 comprising in addition a direct evaporative cooler, said evaporative cooler providing adiabatic cooling of said second air stream before pumping said second air stream into and through said fixed bed treatment units.

3. An apparatus of claim 1 comprising in addition a direct evaporative cooler, said evaporative cooler providing adiabatic cooling of said dehumidified moist air stream.

4. An apparatus of claim 2 comprising in addition a direct evaporative cooler, said evaporative cooler providing adiabatic cooling of said dehumidified moist air stream.

5. Apparatus of claim 1 comprising in addition check valving means providing a single point discharge of said dehumidified moist air stream from said fixed bed treatment units and providing a single point intake of said second air stream into said fixed bed treatment units.

6. Apparatus of claim 5 comprising in addition a direct evaporative cooler, said evaporative cooler providing adiabatic cooling of said second air stream before drawing said second air stream into and through said fixed bed treatment units.

7. Apparatus of claim 5 comprising in addition a direct evaporative cooler, said evaporative cooler providing adiabatic cooling of said dehumidified moist air stream.

8. Apparatus of claim 6 comprising in addition a direct evaporative cooler providing adiabatic cooling of said dehumidified moist air stream.

* * * * *